C. S. WRIGHT.
MEASURING LINE REEL.
APPLICATION FILED JULY 30, 1913.
1,123,642.
Patented Jan. 5, 1915.
2 SHEETS—SHEET 1.
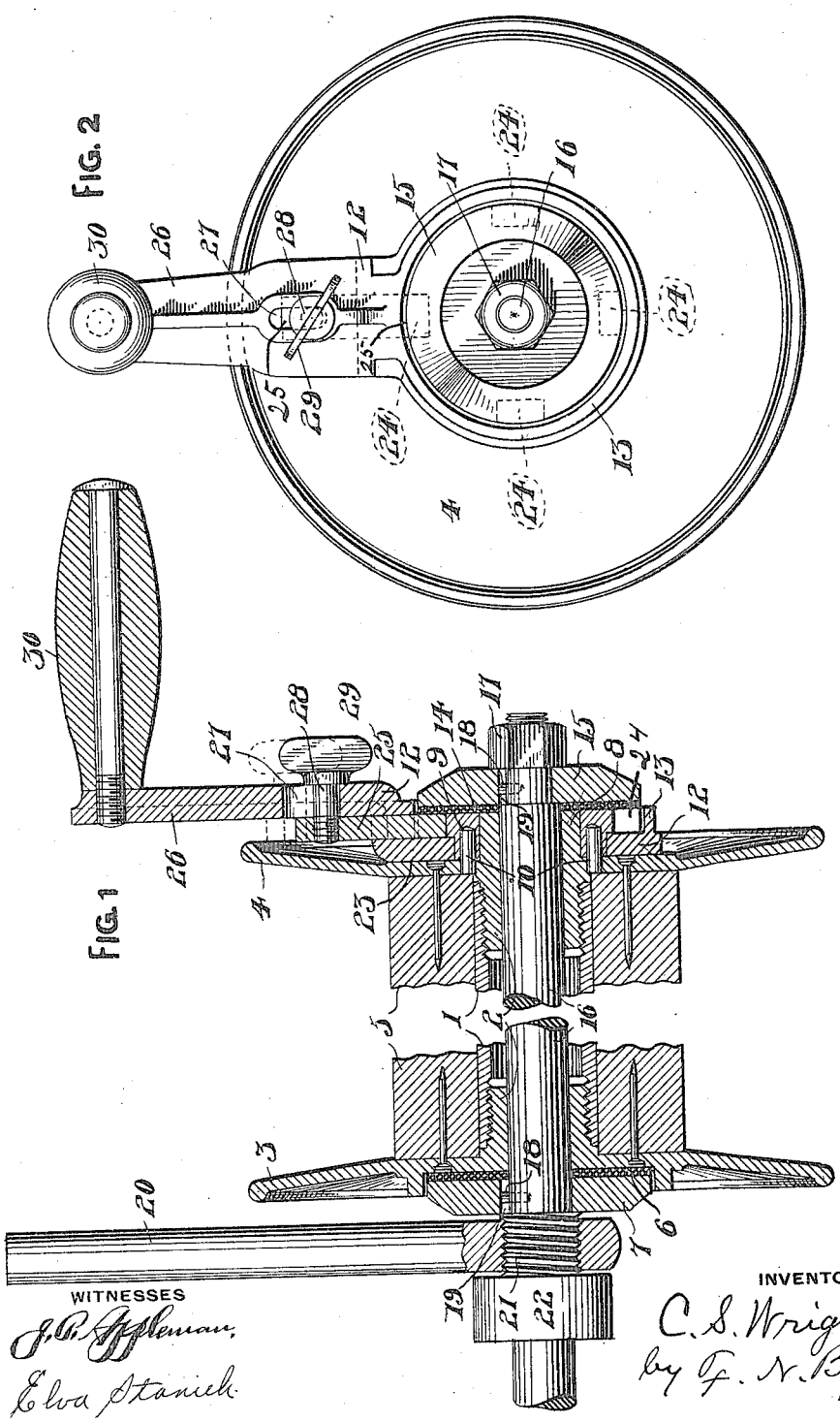
WITNESSES
INVENTOR
C. S. Wright
by F. N. Barber
ATTORNEY

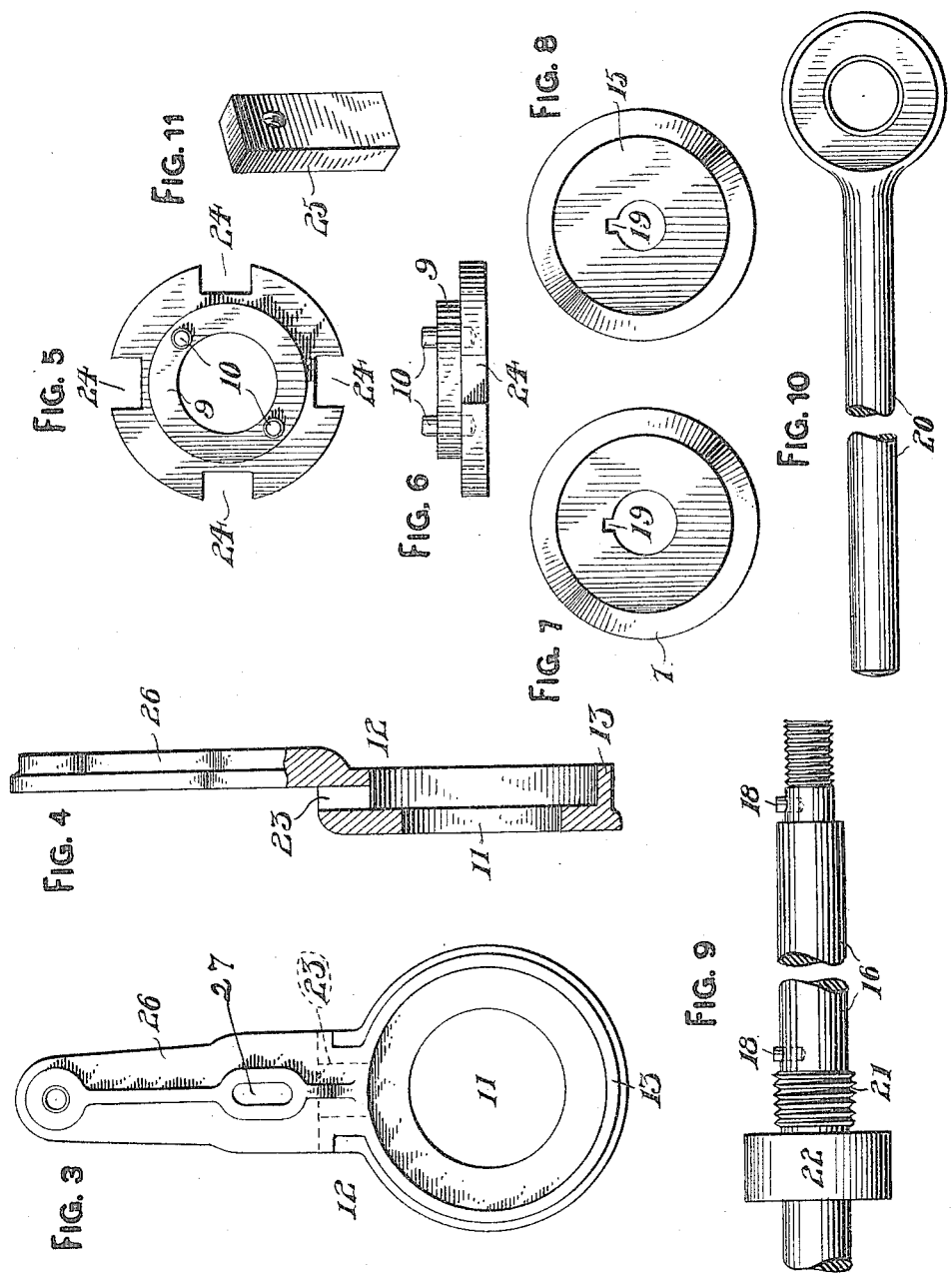

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

MEASURING-LINE REEL.

1,123,642.

Specification of Letters Patent.

Patented Jan. 5, 1915.

Application filed July 30, 1913. Serial No. 782,127.

*To all whom it may concern:*

Be it known that I, CLYDE S. WRIGHT, a citizen of the United States, residing at Toledo, in the county of Lucas and State of Ohio, have invented new and useful Improvements in Measuring-Line Reels, of which the following is a specification.

My invention relates to reels for lowering and raising measuring lines for oil wells and the like. Its object is to provide a reel of this character that has a handle which may be disconnected from the body of the reel when the line is lowered, and connected therewith when the line is to be rewound on the said body.

Referring to the accompanying drawings, Figure 1 is a central longitudinal section of a reel embodying my invention; Fig. 2, an end elevation thereof; Fig. 3, an elevation of the handle with parts omitted; Fig. 4, a longitudinal section of Fig. 3; Fig. 5, an elevation of the locking disk; Fig. 6, an edge view of Fig. 5; Figs. 7 and 8, elevations of the friction disks; Fig. 9, a side elevation of the reel-shaft; Fig. 10, an elevation of the brake-lever; and Fig. 11, a perspective view of the locking dog or catch.

On the drawings, 1 is a sleeve internally threaded at both ends, into which the bosses 2 on the reel or spool-heads 3 and 4 are screwed. The body 5 of the spool or reel surrounds the sleeve 1 and is connected to the heads 3 and 4 by nails. The head 3 has a recess to receive the friction material 6 and the disk 7. The head 4 has the hub or projection 8, which is surrounded by the locking-disk 9 secured to the head 4 by the dowel-pins 10. The inner end of the disk 9 is reduced in diameter, this end fitting a central opening 11 in the handle-member 12, which has the annular flange 13 located a short distance away from the central opening. The outer portion of the disk 9 lies against or overlaps the annular portion of the handle-member between the hole and the flange 13 and serves as a retaining member for the handle-member. The friction material 14 bears on the outer end of the disk 9 and the disk 15 bears on the material 14. The shaft 16 extends through central alined openings in the disks 7 and 15, the friction material 6 and 14, the bosses 2 and the heads 3 and 4, and the sleeve 1. The nut 17 on the end of the shaft nearest the handle-member bears on the outer face of the disk 15. The shaft 16 has the radial pins 18 fitting in the slots 19 in the disks 7 and 15. 20 is the brake-lever or handle working in a well known manner on the threaded portion 21 of the shaft 16 between the disk 7 and the collar 22 on the shaft. The said flange 13 is provided with a radial opening 23 in line with the large portion of the disk 9, which is provided with peripheral notches 24 to receive the inner end of the latch or catch 25 slidable in the said opening. The radial arm 26 extends out from the said flange 13 beyond the said catch. The arm has the radial slot 27 to receive the body of the set screw 28 having one end screwed into the catch 25 and the other end provided with a winged head 29 bearing on the outer face of the arm. 30 is a crank pin or handle on the end of the arm 26, to be grasped by the operator's hand.

When a line on the spool or reel body is to be lowered into a well, the screw 28 is loosened, the latch 25 is slid outwardly in the opening 27 until the end of the latch has been drawn entirely out of the notch 23 in which it was seated, and the set-screw is then turned down on the arm to hold the latch in its withdrawn or retracted position. The line can then be lowered without the handle-member rotating with the reel-body. As the arm of the handle-member is eccentrically located, it produces unevenness in the operation of the reel when lowering the line when it is rigidly connected to the reel-body. When the line is to be rewound the latch is slid into one of the notches 24 thereby connecting the reel-body and the handle-member 12 rigidly together. The handle 30 is then grasped and the line reeled up in an obvious manner.

I claim—

In a reel, a spool, a handle-member having a central opening, a disk having a reduced portion within the opening and a large portion lying on the portion around the opening, means connecting the disk to the spool, and a disk engaging the outer end of the first named disk and serving as a brake for the spool and as a retaining means for the latter disk, a latch carried by the handle-member and adapted to move transversely of the spool and enter a notch in the periphery of the disk.

Signed at Toledo, Ohio this 24th day of July, A. D. 1913.

CLYDE S. WRIGHT.

Witnesses:
R. F. HILL,
M. N. TABER.

Copies of this patent may be obtained for five cents each, by addressing the "Commissioner of Patents, Washington, D. C."